US007077316B2

(12) United States Patent
Lin et al.

(10) Patent No.: US 7,077,316 B2
(45) Date of Patent: Jul. 18, 2006

(54) ALL-IN-ONE INTEGRATED MEMORY CARD READER

(75) Inventors: Tseng-Shyang Lin, Taipei (TW); Ching-Yi Yeh, Taipei (TW); Fu-Ching Wang, Taipei (TW)

(73) Assignee: Northstar Systems Corp., Taiwan (TW)

( * ) Notice: Subject to any disclaimer, the term of this patent is extended or adjusted under 35 U.S.C. 154(b) by 0 days.

(21) Appl. No.: 10/941,817

(22) Filed: Sep. 16, 2004

(65) Prior Publication Data

US 2006/0054697 A1   Mar. 16, 2006

(51) Int. Cl.
*G07K 7/08* (2006.01)
(52) U.S. Cl. ...................................... 235/451; 235/441
(58) Field of Classification Search ................ 235/451; 257/690
See application file for complete search history.

(56) References Cited

U.S. PATENT DOCUMENTS

| 5,679,007 | A  | * | 10/1997 | Potdevin et al. | ........... 439/76.1 |
| 6,402,558 | B1 | * | 6/2002  | Hung-Ju et al.  | ............ 439/638 |
| 6,642,614 | B1 | * | 11/2003 | Chen            | ........................... 257/690 |
| 2002/0110073 | A1 | * | 8/2002 | Shu et al.      | ...................... 369/99 |
| 2003/0095386 | A1 | * | 5/2003 | Le et al.       | ...................... 361/737 |
| 2004/0235354 | A1 | * | 11/2004 | Takahashi      | .................... 439/630 |

* cited by examiner

*Primary Examiner*—Thien M. Le
*Assistant Examiner*—Kristy A. Haupt
(74) *Attorney, Agent, or Firm*—Bacon & Thomas, PLLC

(57) ABSTRACT

The present invention is an integrated memory card reader. It relates to a card reader with connecting terminals arranged in layered style to accommodate the insertion of distinct specification memory cards. By way of integrating chip, connecting terminals, and layout of printed circuit on the base board, multiple complex connecting terminals are integrated in one to support an unified connecting specification, and through modularizing the memory connector as well as the integrated circuit base board, the card reader is downsized to facilitate being embedded into the main unit of an electrical appliance.

6 Claims, 6 Drawing Sheets

ALL-IN-ONE INTEGRATED MEMORY CARD READER

BACKGROUND OF THE INVENTION

1) Field of the Invention

The present invention is an integrated memory card reader. Specifically, it is a card reader to accommodate the insertion of distinct specification memory cards. By way of integrating chip, connecting terminals, and layout of printed circuit on the base board, multiple complex connecting terminals are integrated into one unified connecting specification, in order to facilitate being embedded into or connected to the main unit of an electrical appliance.

2) Description of the Prior Art

The flash memory has been applied to many information/electrical appliances. To make the stored data portable, manufacturers have developed distinct specification flash memory cards with different specifications to carry data, Currently available specifications of memory cards include: Compact-Flash Card (also named as CF Card), Secure-Digital Card (also named as SD Card), Memory-Stick Card (also named as MS Card), Smart-Media Card (also named as SM Card), XD Picture Card (also named as XD Card), Multi Media Card (also named as MMC Card), etc.

With the miscellaneous specifications of memory cards, the card-reading interface should supply different connector specifications to meet the needs of consumers. Thus, the card reader to accept multiple cards is available now, which intends to integrate the card readers to solve the problem of miscellaneous specification memory cards.

Currently available all-in-one type card reader provides miscellaneous distinct specification connectors on a base board to read distinct specification memory cards. However, multiple connectors complicates the connecting terminals since the memory cards with specifications disclosed above needs more than 98 connecting terminals. The problem is aggravated if we intend to integrate the card reader into an electrical appliance.

SUMMARY OF THE INVENTION

The primary object of the invention is to integrate miscellaneous specification connecting terminals as one unified connecting interface, which is installed at a card reader to accommodate the insertion of distinct specification memory cards. By way of integrating chip, connector, and design of printed circuit on the base board, miscellaneous specification connecting terminals are integrated as one interconnecting specification, complicated connecting circuit on the integrated base board becomes unnecessary, the related manufacturers of electrical appliances thus can embed the integrated card reader into the appliances easily.

The secondary object of the invention is to provide a card reader, which integrates miscellaneous specification connecting terminals such that these connecting terminals share a common specification connector and connect to the connecting port at the main unit side through the connector, thus facilitate the customized installation and upgrading.

The detailed descriptions as well as the technical contents of the invention shall be given with the accompanying drawings hereunder.

DETAILED DESCRIPTION OF THE PREFERRED EMBODIMENTS

Figure 1:
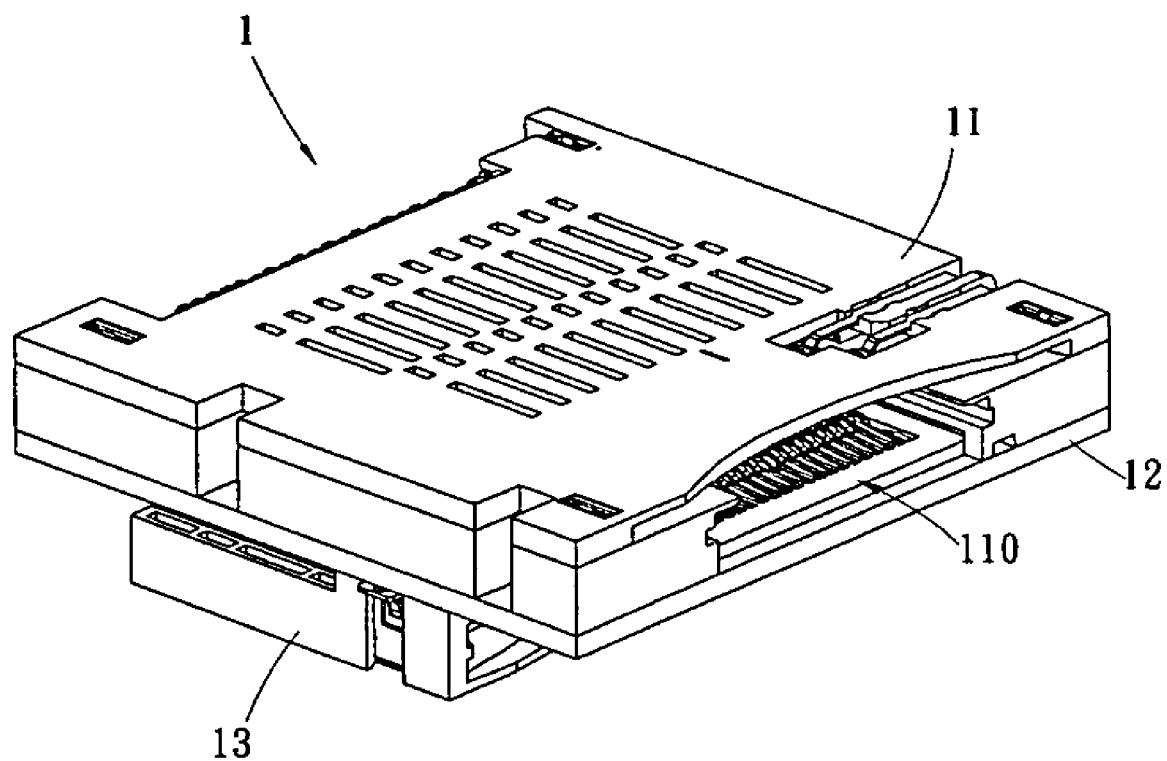
FIG. 1 shows an elevational view according to the invention.
Figure 2:
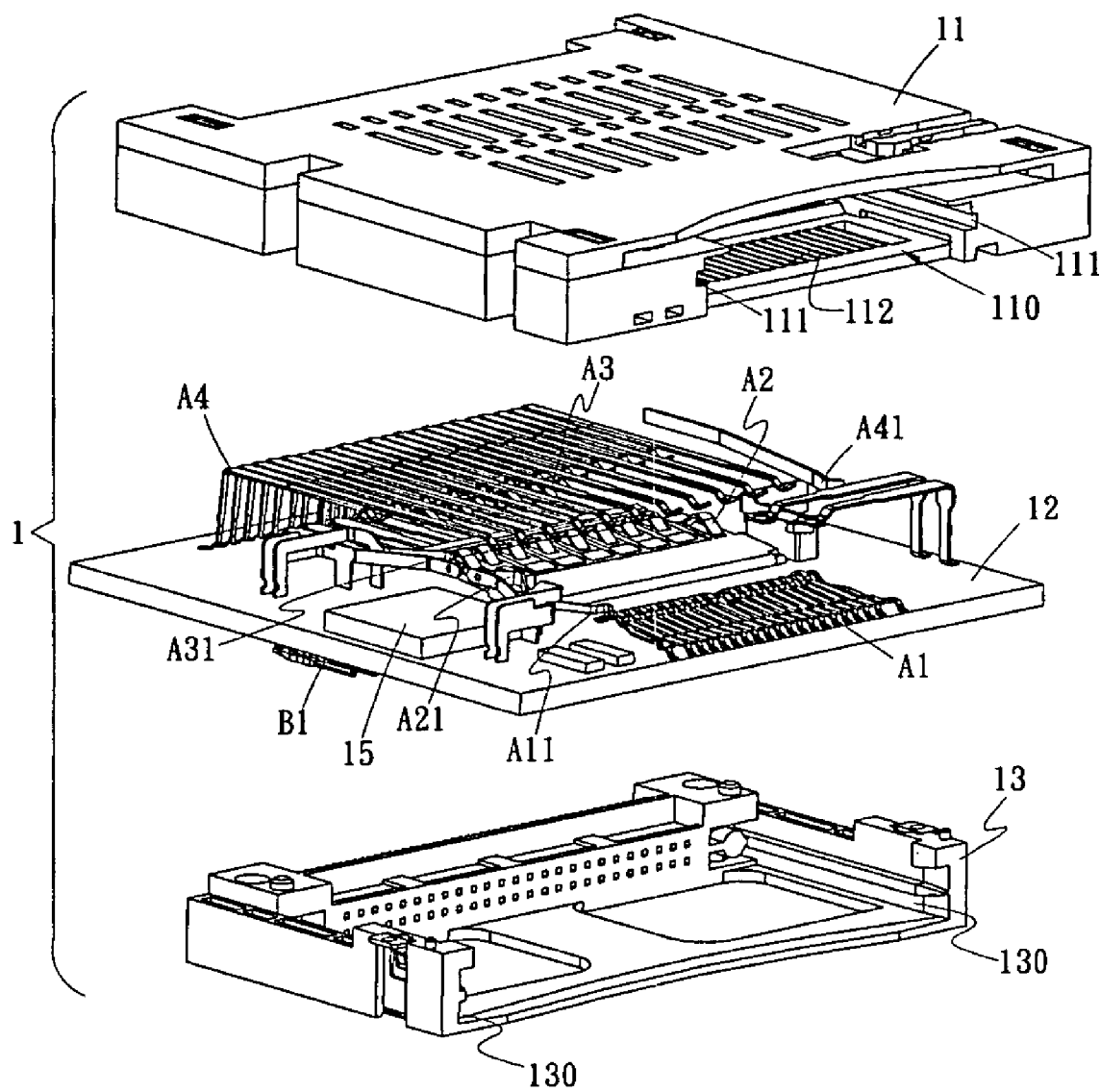
FIG. 2 shows an exploded elevational view according to the invention.
Figure 7:
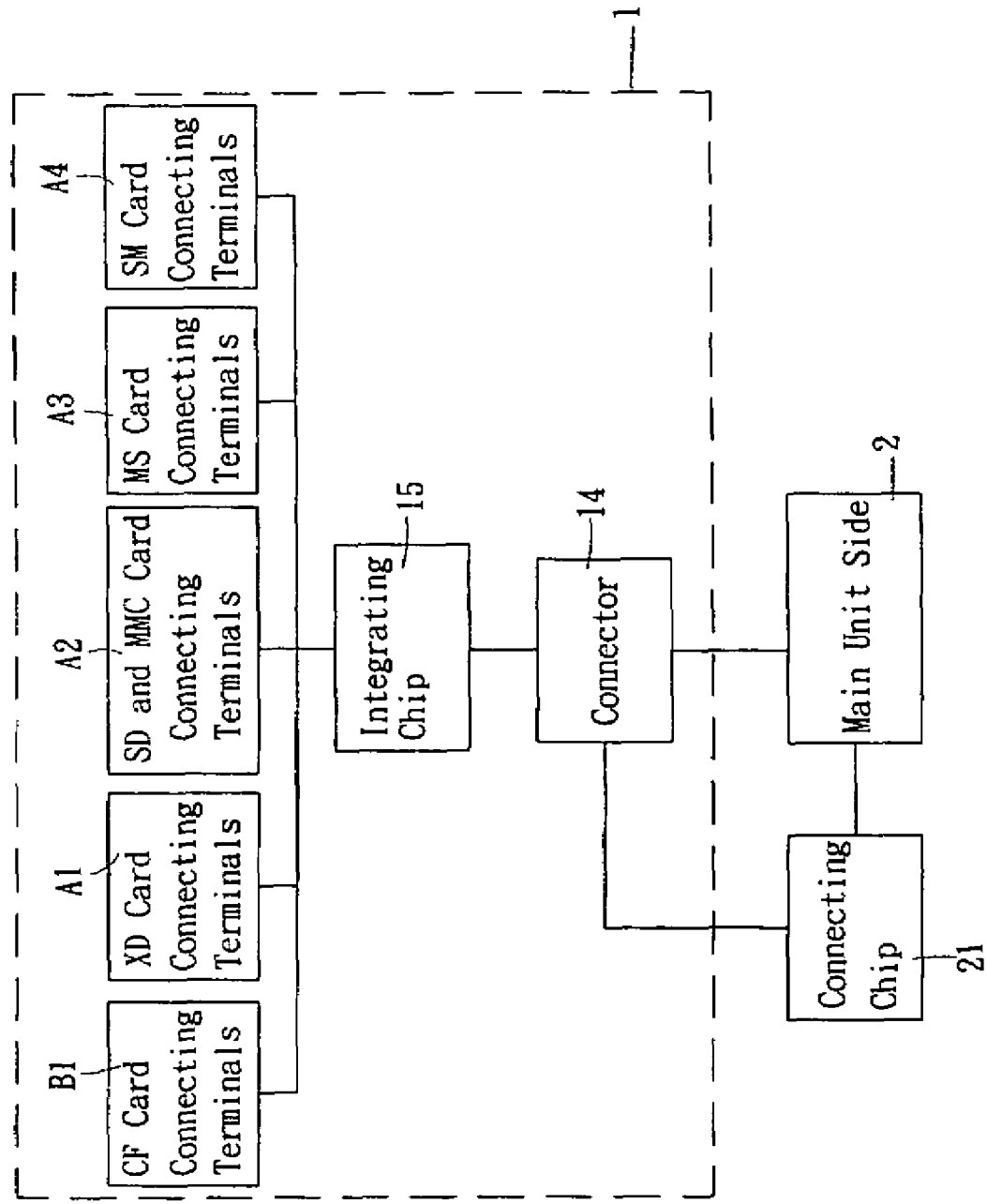
FIG. 7 shows the interconnection between blocks according to the invention.

Referring to FIGS. 1 and 2, in which the card reader 1 according to the invention at least includes an upper socket 11, a base board 12, a connector 14, a lower socket 13, integrating chip 15, multiple start-up terminals, and multiple connecting terminals, where the base board 12 is laid with printed circuit such that the terminals of different specifications are connected to the integrating chip 15 and then connected to main unit side 2 by way of connector 14. For the connection between base board and main unit side, it is feasible to replace male-female connection of the connector 14 with a connecting cable 21, as shown in FIG. 7.

The base board 12 has an upper socket 11 installed on the upper side. The upper socket 11 has an embedding hole 110 at the front of its side part. With the fall of ladder-shaped wall face 111, distinct specification memory cards can be inserted into the same embedding hole 110. Further, the bottom side of embedding hole 110 is provided with multiple through slots 112 such that connecting terminals can be embedded through and get contacted with the memory card.

An integrating chip 15 and multiple metal terminals are welded on the base board 12, in which the metal terminals are distinguished by different specifications. For each specification, connecting terminals and start-up terminals are included, where the function of connecting terminals is to transfer files when contacting memory card, while start-up terminals is responsible for start-up control at the time that a distinct specification memory card is inserted.

To go along with distinct specification memory cards, the card reader 1 utilizes layered and real locatable space to make connecting terminals A1, A2, A3, and A4 respectively correspond to different heights of embedding holes 110, such that multiple distinct specification memory cards can be inserted into an embedding hole 110.

Figure 4:
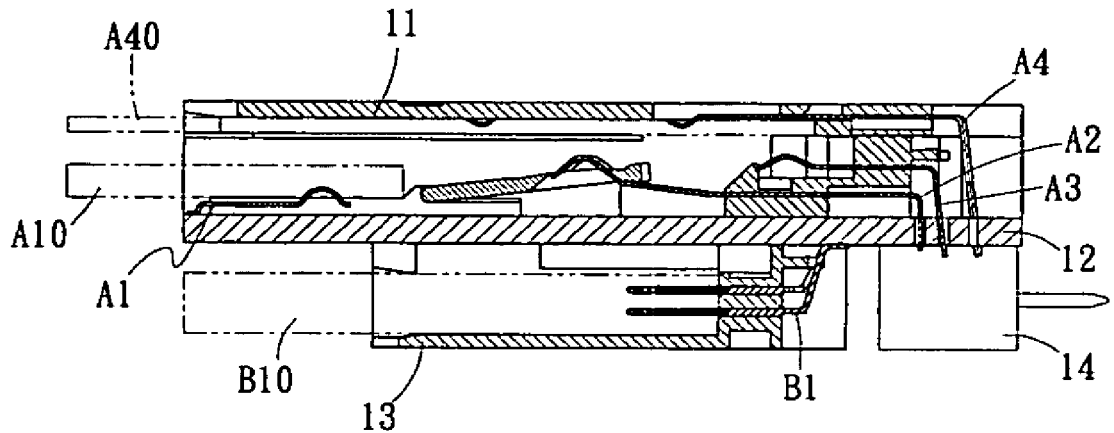
FIG. 4 shows the first sectional view when memory card is embedded in the invention.
Figure 5:
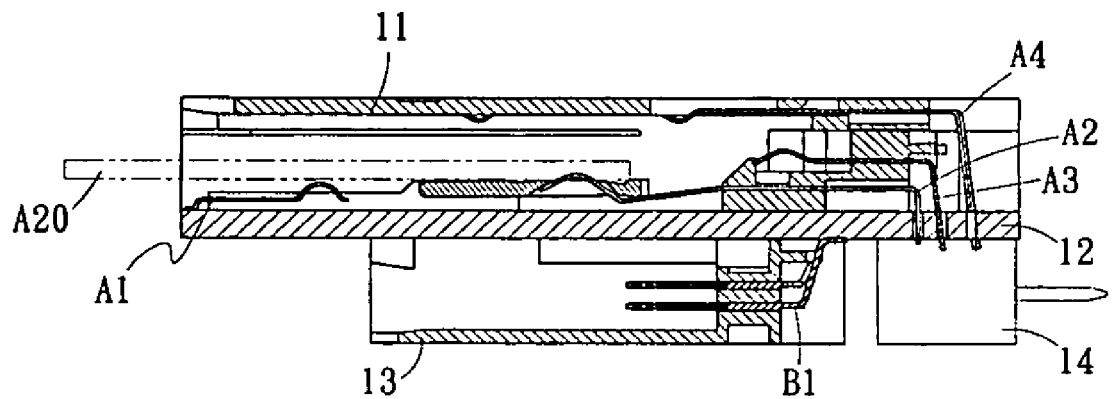
FIG. 5 shows the second sectional view when memory card is embedded in the invention.
Figure 6:
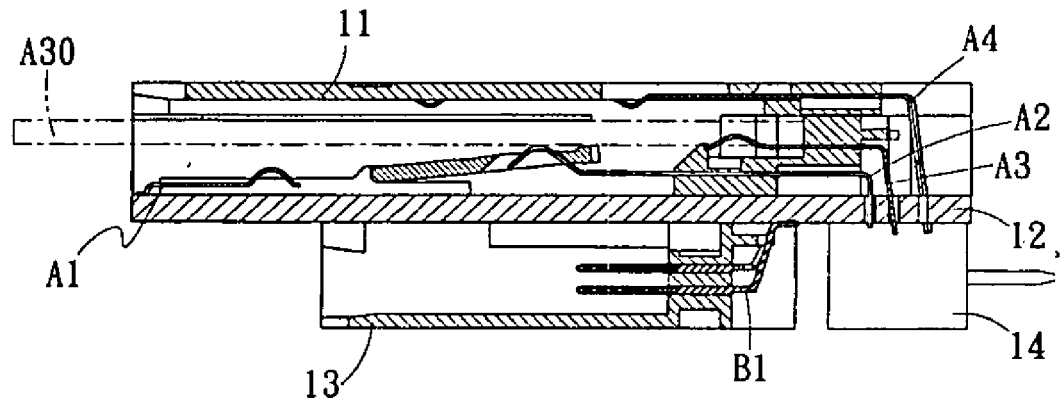
FIG. 6 shows the third sectional view when memory card is embedded in the invention.

The mechanism is that, connecting terminals A1 are provided at the edge of base board 12, an start-up terminal A11 is installed at one side to control the start-up when a memory card of A10 specification is inserted (as shown in FIG. 4). Further, at the rear side of base board 12, connecting terminals A2 as well as a corresponding start-up terminal A21 installed at one side are provided to support the insertion of a memory card with A10 specification (as shown in FIG. 5). In the same way, connecting terminals A3 and connecting terminals A4 are subsequently installed at the rear side of connecting terminals A2, with start-up terminals A31 and A41 respectively provided at their side parts, to respectively support the insertion of a memory card with A30 specification (as shown in FIG. 6) and A40 specification (as shown in FIG. 4).

Figure 3:
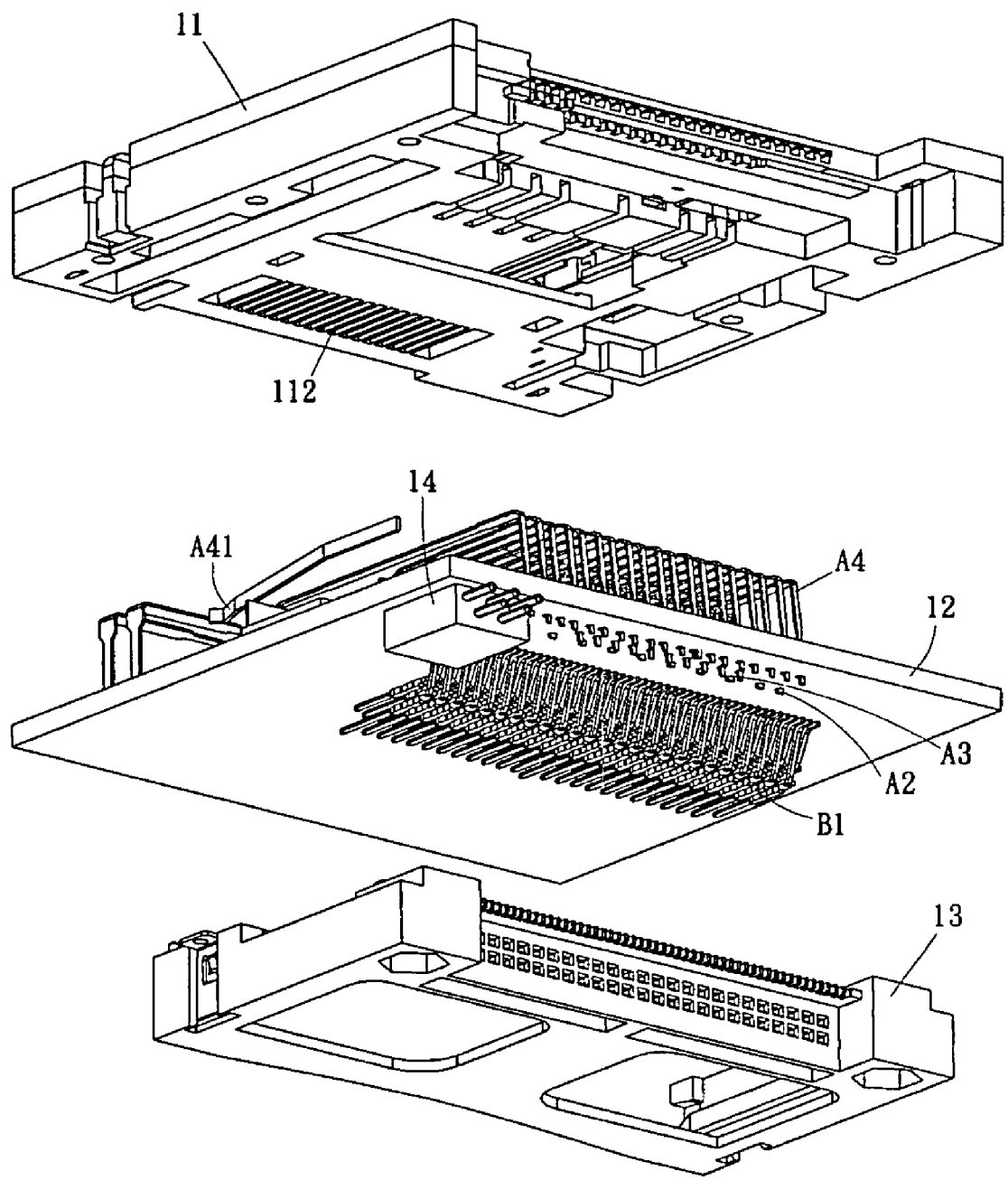
FIG. 3 shows another exploded elevational view according to the invention.

Further, referring to FIG. 3, connecting terminals B1 and a connector 14 are welded at bottom side of base board 12. Connecting terminals B1 are embedded inside the lower socket 13 while the lower socket 13 provides a pair of tracks 130 at both sides to accept the insertion of B10 memory card. The welding points of connecting terminals A1, A2, A3, A4 as well as connecting terminals B1 are all clustered at the rear side of lower surface of base board 12 and the contacts of terminals are exposed in order to facilitate welding processes of terminals installation as well as post-process examination and maintenance.

Figure 8:
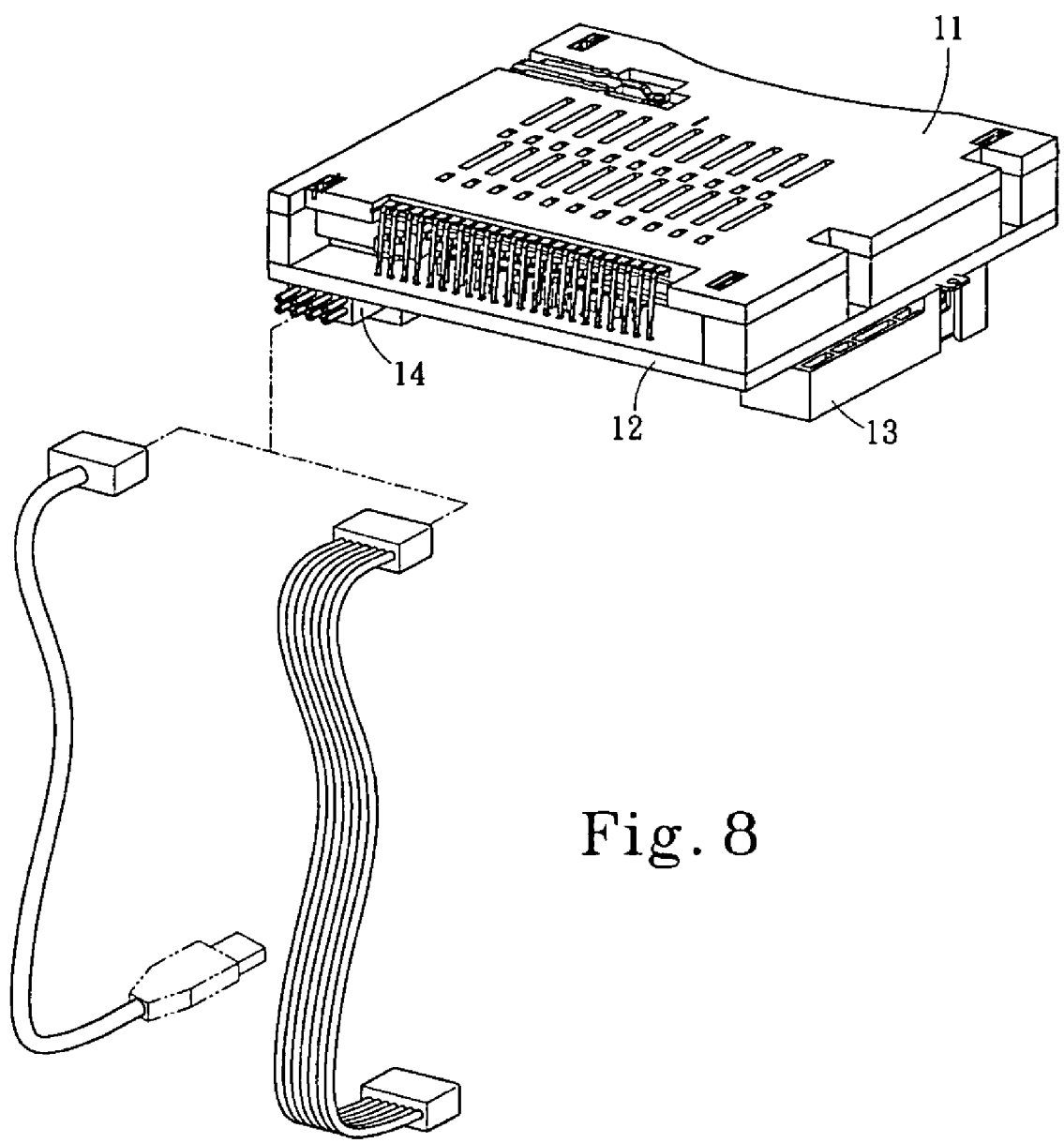
FIG. 8 shows an embodiment of connecting cable according to the invention.

Conclusive from the above, through the structural design of layered connecting terminals, the whole size is reduced, and through utilizing integrating chip 15 and connector 14 as well as the printed circuit on the base board, multiple connecting terminals are integrated as one shared connecting specification to connect main unit side. Further referring to FIG. 8, to connect or embed the card reader according to the invention into related electrical appliances, the connector 14 can be connected to the main unit side through a connecting cable 21, in which one end of connecting cable 21 is fixed to connector 14 while the other end can be a connector of any type of universal serial ports.

The invention claimed is:

1. An integrated card reader of memory card, which is a card reader that can accept insertion of miscellaneous distinct specification memory cards, comprising:

a base board, an upper socket disposed on an upper side of the base board and a lower socket disposed on a lower side of the base board, a connector, and multiple start-up and connecting terminals having distinct specifications wherein said base board comprises a printed circuit board embedded with an integrating chip, the printed circuit board being laid with a printed circuit to connect said multiple start-up and connecting terminals to the integrating chip, said multiple start-up and connecting terminals being installed on said base board;

wherein said integrating chip is an integrated circuit integrating all of said terminals; and wherein said connector is connected to an output of integrating chip;

such that, the card reader utilizes the integrating chip, connector, and printed circuit on the base board to integrate the connecting terminals having distinct specifications into one connecting specification of the connector, whereby it becomes unnecessary to provide complicated connecting circuits, thus facilitating being planted or integrated into related electrical appliances.

2. The integrated card reader of memory card in accordance with claim 1, wherein wall faces at both sides of an embedding hole of the upper socket are ladder-shaped with different widths and heights, and the structure of connecting terminals are layered to allow insertion of distinct specification memory card.

3. The integrated card reader of memory card in accordance with claim 1, wgerein the connecting terminals and start-up terminals as well as the connector are provided at the same surface of the base board, such that the welding points are clustered and exposed to facilitate manufacturing processes as well as post-process axamination and maintenance.

4. The integrated card reader of memory card in accordance with claim 1, wherein the integrating chip utilizes the printed circuit laid on the base board to integrated terminals of distinct specifications, and output through the connector after processing, thus unifies the connection to connecting terminals of distinct specification memory cards.

5. The integrated card reader of memory card in accordance with claim 1, wherein the connector is a male connecting part.

6. The integrated card reader of memory card in accordance with claim 1, wherein the connector can connect to a main unit side through a connecting cable.

* * * * *